US008630187B1

(12) United States Patent
Rodberg et al.

(10) Patent No.: US 8,630,187 B1
(45) Date of Patent: Jan. 14, 2014

(54) METHOD AND SYSTEM FOR TESTING A NETWORK SWITCHING APPARATUS

(75) Inventors: Gustavo Rodberg, Karmiel (IL); Alexay Groisman, Modiin (IL); Izik Ovadia-Goldberg, Givatayim (IL); Felix Kaufman, Rishon Lezion (IL); Raviv Shasha, Petah Tikva (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 204 days.

(21) Appl. No.: 13/329,923

(22) Filed: Dec. 19, 2011

Related U.S. Application Data (60) Provisional application No. 61/425,103, filed on Dec. 20, 2010.

(51) Int. Cl.
*H04L 12/26* (2006.01)

(52) U.S. Cl.
USPC ............. 370/241; 370/248; 370/250; 714/25; 714/30; 714/36

(58) Field of Classification Search
USPC ................. 370/241, 248, 249, 250, 242, 245; 714/18, 25, 28, 30, 31, 36
See application file for complete search history.

(56) References Cited

U.S. PATENT DOCUMENTS

| | | | |
|---|---|---|---|
| 6,473,405 B2 * | 10/2002 | Ricciulli | 370/238 |
| 7,120,122 B1 * | 10/2006 | Starr et al. | 370/250 |
| 7,668,105 B1 | 2/2010 | Zimmerman | |
| 8,199,656 B1 * | 6/2012 | Kirtley et al. | 370/241 |
| 2003/0016624 A1 * | 1/2003 | Bare | 370/217 |
| 2003/0043745 A1 * | 3/2003 | Kano et al. | 370/238 |
| 2003/0212908 A1 * | 11/2003 | Piesco | 713/201 |
| 2005/0149787 A1 * | 7/2005 | Choi et al. | 714/724 |
| 2005/0185590 A1 * | 8/2005 | Ngo et al. | 370/241 |
| 2005/0268043 A1 * | 12/2005 | Kitamura | 711/131 |
| 2005/0281190 A1 * | 12/2005 | McGee et al. | 370/216 |
| 2006/0229020 A1 * | 10/2006 | Mlinarsky et al. | 455/67.14 |
| 2007/0201386 A1 * | 8/2007 | Desai et al. | 370/278 |
| 2008/0107022 A1 * | 5/2008 | Standridge | 370/231 |
| 2008/0253299 A1 * | 10/2008 | Damm et al. | 370/252 |
| 2009/0075605 A1 * | 3/2009 | Yoshida et al. | 455/91 |
| 2009/0282446 A1 * | 11/2009 | Breed et al. | 725/106 |
| 2010/0054152 A1 * | 3/2010 | Foschiano et al. | 370/253 |
| 2011/0022892 A1 * | 1/2011 | Zhang et al. | 714/27 |
| 2011/0069620 A1 * | 3/2011 | Gintis et al. | 370/250 |
| 2011/0069626 A1 * | 3/2011 | Sun et al. | 370/252 |

* cited by examiner

*Primary Examiner* — Ian N Moore
*Assistant Examiner* — Phong La (57) ABSTRACT

A system for testing a network switching apparatus includes one or more port connections external to the network switching apparatus. The one or more port connections are configured to interconnect selected ports of the network switching apparatus to transfer packets between the selected ports. Further, the system includes a test manager configured to automatically generate a plurality of test scenarios for testing a processing operation to be performed by the network switching apparatus on packets. The test scenarios define paths for forwarding packets multiple times among the ports of the network switching apparatus. The system also includes a packet generator configured to transmit packets to at least a first port of the network switching apparatus to test a processing operation performed by the network switching apparatus.

13 Claims, 5 Drawing Sheets

| PORT | FDID | MAC | MEMBERSHIP | TYPE |
|---|---|---|---|---|
| P0 | 2 | 00:00:00:00:00:01 | 9 | STATIC |
| P1 | 3 | 00:00:00:00:00:01 | 8 | STATIC |
| P2 | 4 | 00:00:00:00:00:01 | 7 | STATIC |
| P3 | 5 | 00:00:00:00:00:01 | 6 | STATIC |
| P4 | 6 | 00:00:00:00:00:01 | 18 | STATIC |
| P5 | 7 | 00:00:00:00:00:01 | 17 | STATIC |
| P6 | 8 | 00:00:00:00:00:01 | 16 | STATIC |
| P7 | 9 | 00:00:00:00:00:01 | 15 | STATIC |
| P8 | — | 00:00:00:00:00:01 | — | STATIC |
| P9 | 11 | 00:00:00:00:00:01 | 2 | STATIC |
| P10 | X | 00:00:00:00:00:01 | 3 | STATIC |
| P11 | X | 00:00:00:00:00:01 | 4 | STATIC |
| P12 | X | 00:00:00:00:00:01 | 5 | STATIC |
| P13 | 15 | 00:00:00:00:00:01 | 11 | STATIC |
| P14 | 16 | 00:00:00:00:00:01 | X | STATIC |
| P15 | 17 | 00:00:00:00:00:01 | X | STATIC |
| P16 | 18 | 00:00:00:00:00:01 | X | STATIC |
| P17 | — | 00:00:00:00:00:01 | — | STATIC |

METHOD AND SYSTEM FOR TESTING A NETWORK SWITCHING APPARATUS

INCORPORATION BY REFERENCE

This application claims the benefit of U.S. Provisional Application No. 61/425,103, "Random Forwarding of Flows in a Given System Configuration and Test" filed on Dec. 20, 2010, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

To test a network switching apparatus, in a conventional testing system example, a plurality of packet generators are respectively coupled to a plurality of ports of the network switching apparatus to test the plurality of ports simultaneously.

SUMMARY

Aspects of the disclosure provide a system for testing a network switching apparatus. The system includes one or more port connections external to the network switching apparatus. The one or more port connections are configured to interconnect selected ports of the network switching apparatus to transfer packets between the selected ports. Further, the system includes a test manager configured to automatically generate a plurality of test scenarios for testing a processing operation to be performed by the network switching apparatus on packets. The test scenarios define paths for forwarding packets multiple times among the ports of the network switching apparatus. The system also includes a packet generator configured to transmit packets to at least a first port of the network switching apparatus to test a processing operation performed by the network switching apparatus.

According to an aspect of the disclosure, the test manager is configured to generate the test scenarios without knowledge of the one or more port connections, and invalidate the generated test scenarios that are inconsistent with actual port connections.

Aspects of the disclosure also provide a method for testing a network switching apparatus. The method includes determining a plurality of test scenarios for testing a network switching apparatus with one or more port connections external to the network switching apparatus. The one or more port connections are configured to interconnect selected ports of the network switching apparatus to transfer packets between the selected ports. The test scenarios define paths for forwarding packets multiple times among the ports of the network switching apparatus. Further, the method includes providing control parameters to the network switching apparatus to respectively establish the plurality of test scenarios, and providing packets to the network switching apparatus for testing a processing operation of the network switching apparatus on the packets. In an embodiment, the method includes determining the plurality of test scenario without knowledge of the one or more port connections, and invalidating the generated test scenarios that are inconsistent with actual port connections.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
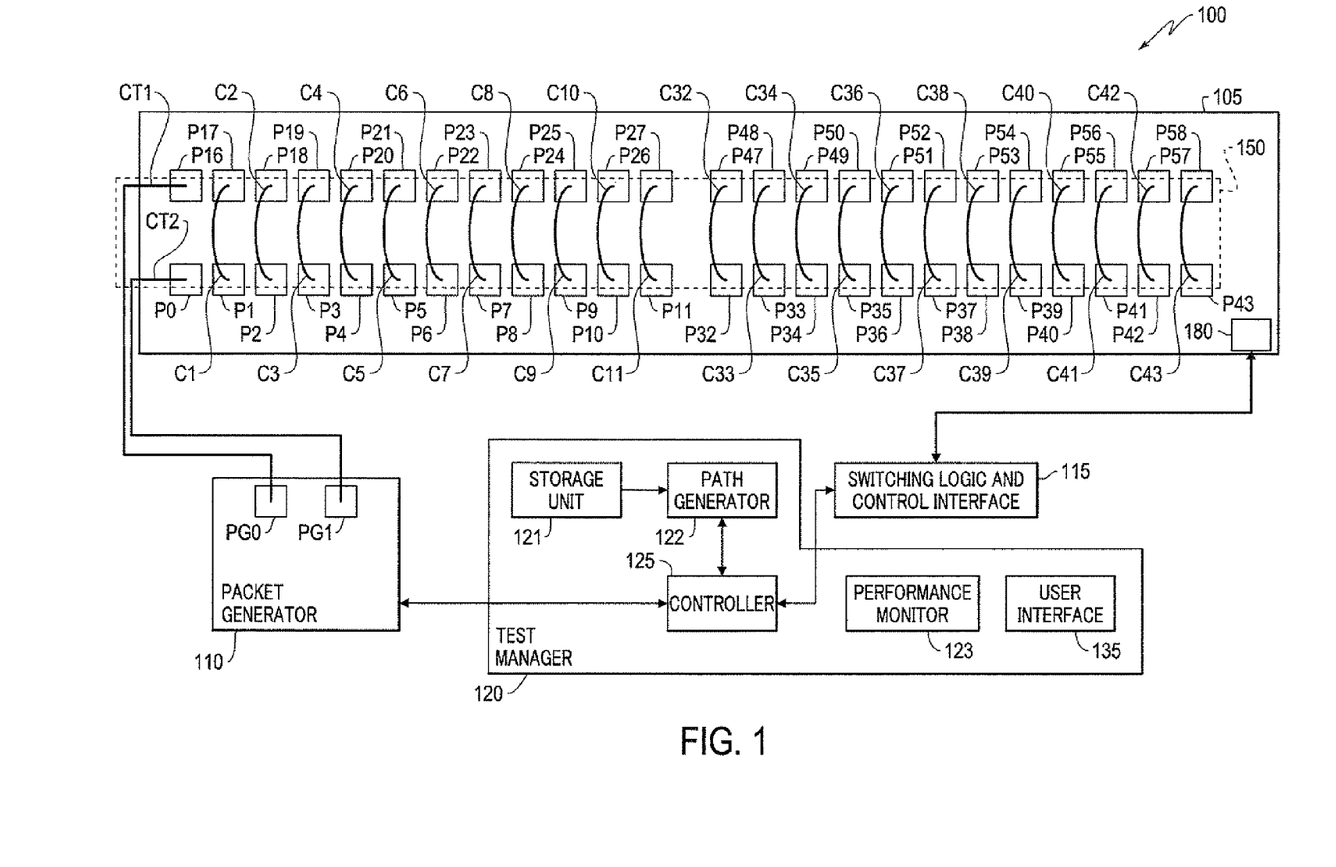
FIG. 1 shows a block diagram of a test system example 100 according to an embodiment of the disclosure.

FIG. 1 shows a block diagram of a system example 100 for testing and evaluating the performance of a network switching apparatus 105 according to an embodiment of the disclosure. The system 100 includes the network switching apparatus 105 under test, an external connection module 150, a packet generator 110, a test manager 120 and a switching logic and control interface 115. These elements are coupled together as shown in FIG. 1.

The network switching apparatus 105 includes a plurality of network ports P0-P58, a switch fabric (not shown), and a switch fabric controller (not shown).

According to an embodiment of the disclosure, the plurality of network ports P0-P58 is bidirectional. Each of the plurality of network port P0-P58 includes an ingress portion (not shown) and an egress portion (not shown). The ingress portion is configured to receive a packet coming into the network switching apparatus 105, direct the packet to the switch fabric. The switch fabric forwards the packet within the network switching apparatus 105. The egress portion is configured to receive a packet from the switch fabric and send the packet out of the network switching apparatus 105. One or more of the network ports P0-P58 can be designated as termination network ports that are coupled to the packet generator 110, in an embodiment. In the FIG. 1 example, the network ports P0 and P16 are designated as termination network ports.

The switch fabric interconnects each network port to other network ports within the network switching apparatus 105. According to an embodiment of the disclosure, the switch fabric controller configures the switch fabric according to control parameters to setup forwarding associations of the switch fabric. According to a forwarding association between a source network port to a destination network port, the switch fabric transmits each packet from the source network port to the destination network port.

According to an embodiment of the disclosure, the network switching apparatus 105 is configured as a single integrated circuit (IC) chip. The switch fabric is configured as a packet processor within the IC chip. In an example, the packet processor is configured to perform Layer 2 switching, and support various Layer 2 switching standards and protocols. For example, the packet processor supports virtual local area network (VLAN) based on port, subnet and protocol. Further, the packet processor supports single and multiple spanning tree, rapid spanning tree, link aggregation, link trunking, and the like. In addition, the packet processor can be configured to perform Layer 3 routing. For example, the packet processor supports IPv4 forwarding in hardware, IP multi-cast routing, and the like.

In another embodiment, the network switching apparatus 105 is configured as a chassis device having line cards and fabric cards. In an example, each of the line cards and the fabric cards is implemented as an IC chip. Each of the line cards includes first input/output (I/O) ports that are suitably coupled with various servers, and second I/O ports that are suitably coupled to I/O ports of the fabric cards. The fabric cards form the switch fabric to switch packets among the line cards.

The external connection module 150 is coupled to the network switching apparatus 105 and the packet generator 110. In FIG. 1 example, the external connection module 150 includes cables or jumpers C1-C43 that couple selected network ports of the network ports P0-P58 externally, and includes cables CT1 and CT2 that couple the packet generator 110 with the network switching apparatus 105.

In an example, a cable is a bidirectional cable that includes two jacks respectively at two ends, and wires connect the two jacks. Each jack includes egress pins configured to make connection with the egress portion of a network port, and ingress pins configured to make connection with the ingress portion of the network port. The wires are crossovered to connect the egress pins of a first jack with the ingress pins of a second jack, and the ingress pins of the first jack with the egress pins of the second jack, in an embodiment. Thus, when the two jacks of the cable are respectively plugged into a first network port and a second network port, the egress portion of the first network port is connected to the ingress portion of the second network port, and the ingress portion of the first network port is connected to the egress portion of the second network port.

In another example, a cable is configured as a single directional cable with two jacks. For example, the cable includes wires that connect the egress pins of a first jack with the ingress pins of a second jack and does not include wires for connecting the ingress pins of the first jack with the egress pins of the second jack. When the first jack is plugged into a first network port and the second jack is plugged into a second network port, the cable couples the egress portion of the first network port with the ingress portion of the second network port, and does not couple the ingress portion of the first network port to the egress portion of the second network port.

In another example, a cable includes a single jack and wires that interconnect the egress pins with the ingress pins of the single jack. Thus, when the jack is plugged in a network port, the cable couples the egress portion of the network port with the ingress portion of the same network port. Then, a packet output from the egress portion of the network port is routed into the ingress portion of the same network port.

It is noted that the external connection module 150 can be implemented using any suitable technique. In an example, the external connection module 150 is an exterior fixture that can be programmed to engage suitable external interconnections with the network switching apparatus 105 and the packet generator 110 in the desired manner. In another example, the external connection module 150 includes individual cables that are manually or automatically coupled to the network switching apparatus 105 and the packet generator 110.

According to an aspect of the disclosure, the external connection module 150 is configured into an external connection configuration that is pre-determined and stored in the test manager 120, for example. According to another aspect of the disclosure, the test manager 120 determines an external connection configuration, and controls the external connection module 150 to configure the external connection module 150 into the determined external connection configuration.

The packet generator 110 generates one or more packet streams and provides the packet streams to the network switching apparatus 105. In the FIG. 1 example, the packet generator 110 includes a first bidirectional port PG0 and a second bidirectional port PG1 that are respectively coupled to the termination network ports P0 and P16. Specifically, in an example, the first bidirectional port PG0 includes an egress portion (not shown) and an ingress portion (not shown). The egress portion of PG0 is coupled to the ingress portion of the termination network port P16, and the ingress portion of PG0 is coupled to the egress portion of the termination network port P16. Similarly, the second bidirectional port PG1 includes an egress portion (not shown) and an ingress portion (not shown). The egress portion of PG1 is coupled to the ingress portion of the termination network port P0, and the ingress portion of PG1 is coupled to the egress portion of the termination network port P0. Thus, in an example, the packet generator 110 generates two packet streams, and provides the two packet streams to the termination network ports P0 and P16. In addition, the packet generator 110 receives routed packet streams output from the termination network ports P0 and P16.

The switching logic and control interface 115 is an interface that enables communication between the test manager 120 and the switch fabric controller of the network switching apparatus 105. In an example, the switching logic and control interface 115 may include a bidirectional network port (not shown) coupled to a network port 180 of the network switching apparatus 105. In addition, the switching logic and control interface 115 is coupled to the test manager 120 using any suitable technique. Thus, the test manager 120 can provide control parameters to the network switching apparatus 105 via the switching logic and control interface 115. Although the switching logic and control interface 115 of this embodiment is exterior to the network switching apparatus 105, the components and programming used to implement the switching logic and control interface 115 can be disposed interior to the network switching apparatus 105 or the test manager 120.

The test manager 120 is configured to manage an automatic testing flow for testing and evaluating the performance of the network switching apparatus 105. In the FIG. 1 example, the test manager 120 includes a storage unit 121, a path generator 122, a user interface 135, a performance monitor 123 and a controller 125. These elements are coupled together as shown in FIG. 1.

The storage unit 121 can be any type of storage, such as a hard drive, a storage disc, a flash drive, a semiconductor memory, and the like. The storage unit 121 stores a data file for the path generator 122. In an example, the storage unit 121 stores the external connection configuration of the external connection module 150. In another example, the storage unit 121 stores a log file that logs seeds for a pseudo random number generator.

The path generator 122 determines control parameters for the switch fabric controller to enable internal forwarding associations of the switch fabric. In an embodiment, the path generator 122 is configured to generate one or more packet paths formed by a combination of the existing external connection configuration and internal forwarding associations. Then, according to the one or more packet paths, the path generator 122 determines the control parameters that enable the internal forwarding associations. In an embodiment, the switch fabric is configured as a packet processor that performs Layer 2 switching. The switch fabric controller sets up a forward data base based on the control parameters. The forward data base defines internal forwarding associations. Then, the packet processor performs the Layer 2 switching based on the forward data base.

According to an aspect of the disclosure, the path generator 122 uses a random number generator to generate the one or more packet paths. In an example, the path generator 122 uses the random number generator to generate vectors corresponding to the packet paths. In an embodiment, the path generator 122 uses a pseudo random number generator to generate the one or more packet paths based on seeds. In an example, the pseudo random number generator uses a time stamp, such as a system time, as a seed to generate a set of random numbers for generating packet paths in a test run. The time stamp is logged. When a retest is needed, the logged time stamp is retrieved, and the pseudo random number generator can generate the same set of random numbers based on the same seed. Thus, the same packet paths can be re-generated to repeat the test run.

In an example, the path generator 122 uses a random number generator to generate the one or more packet paths for a test scenario. Then, the path generator 122 includes a validator configured to validate the test scenario. For example, the validator validates all the port combinations of the forwarding associations in the test scenario are valid port combinations.

According to another aspect of the disclosure, the path generator 122 uses suitable algorithm to generate the one or more packet paths for a test scenario based on the external connection module 150 in a deterministic manner, such that the test scenario is valid for sure, and the validator is not needed.

The user interface 135 provides an interface for a user to provide input to the test flow and to receive test results.

The controller 125 controls the test flow. In an embodiment, the controller 125 controls the path generator 122 to generate control parameters. Then, the controller 125 provides the control parameters to the switching logic and control interface 115 to configure the network switching apparatus 105. Further, the controller 125 controls the packet generator 110 to generate packets to test the network switching apparatus 105.

The performance monitor 123 is configured to monitor or evaluate the performance of the network switching apparatus 105 during the test. The performance can be provided to a user via the user interface 135. In an example, the performance monitor 123 checks the routed packets for packet loss, and evaluates the performance based on packet loss.

In another example, the performance monitor 123 monitors a temperature of the network switching apparatus 105, and evaluates the performance based on the temperature.

During operation, for example, the storage unit 121 stores a present external connection configuration of the external connection module 150. The controller 125 instructs the path generator 122 to generate one or more packet paths for a first test run (a first test scenario) based on the present external connection configuration. The one or more packet paths are a combination of the present external connection configuration, and internal forwarding associations. Then, the controller 125 or the path generator 122 determines control parameters that can control the switch fabric controller to enable the internal forwarding associations. The controller 125 provides the control parameters to the switching logic and control interface 115 to pass the control parameters to the switch fabric controller in the network switching apparatus 105. Then, the switch fabric controller controls the switch fabric according to the control parameters to enable the internal forwarding associations. Further, the controller 125 instructs the packet generator 110 to generate one or more packet streams, and send the one or more packet streams to the termination network ports of the network switching apparatus 105 to start the first test run.

During the first test run, the performance monitor 123 monitors the performance of the network switching apparatus 105. After the first test run, the controller 125 logs the performance in association with a time stamp, and may also provide the monitored performance to a user via the user interface 135.

Then, the controller 125 instructs the path generator 122 to generate one or more packet paths for a second test run (a second test scenario) based on the present external connection configuration. The one or more packet paths are a combination of the present external connection configuration, and internal forwarding associations. In an embodiment, the present external connection configuration is same for the first test run and the second test run. However, because the path generator 122 is configured to generate packet paths based on a random number generator, or a pseudo random number generator that uses a time stamp as seed, in an embodiment, the packet paths of the second test run include different internal forwarding associations from the packet paths of the first test run.

Then, the controller 125 or the path generator 122 determines control parameters that can control the switch fabric controller to enable the internal forwarding associations for the second test run. The controller 125 provides the control parameters to the switching logic and control interface 115 to pass the control parameters to the switch fabric controller in the network switching apparatus 105. Then, the switch fabric controller controls the switch fabric according to the control parameters to enable the internal forwarding associations for the second test run. Further, the controller 125 instructs the packet generator 110 to generate one or more packet streams, and send the one or more packet streams to the termination network ports of the network switching apparatus 105 to start the second test run.

During the second test run, the performance monitor monitors the performance of the network switching apparatus 105. After the second test run, the controller 125 logs the performance in association with time stamp, and may also provide the monitored performance to a user via the user interface 135.

In an embodiment, the system 100 automatically performs a predetermined number of test runs. In another embodiment, the system 100 continues performing test runs to test the network switching apparatus 105 until an interrupt is generated.

Figure 2:
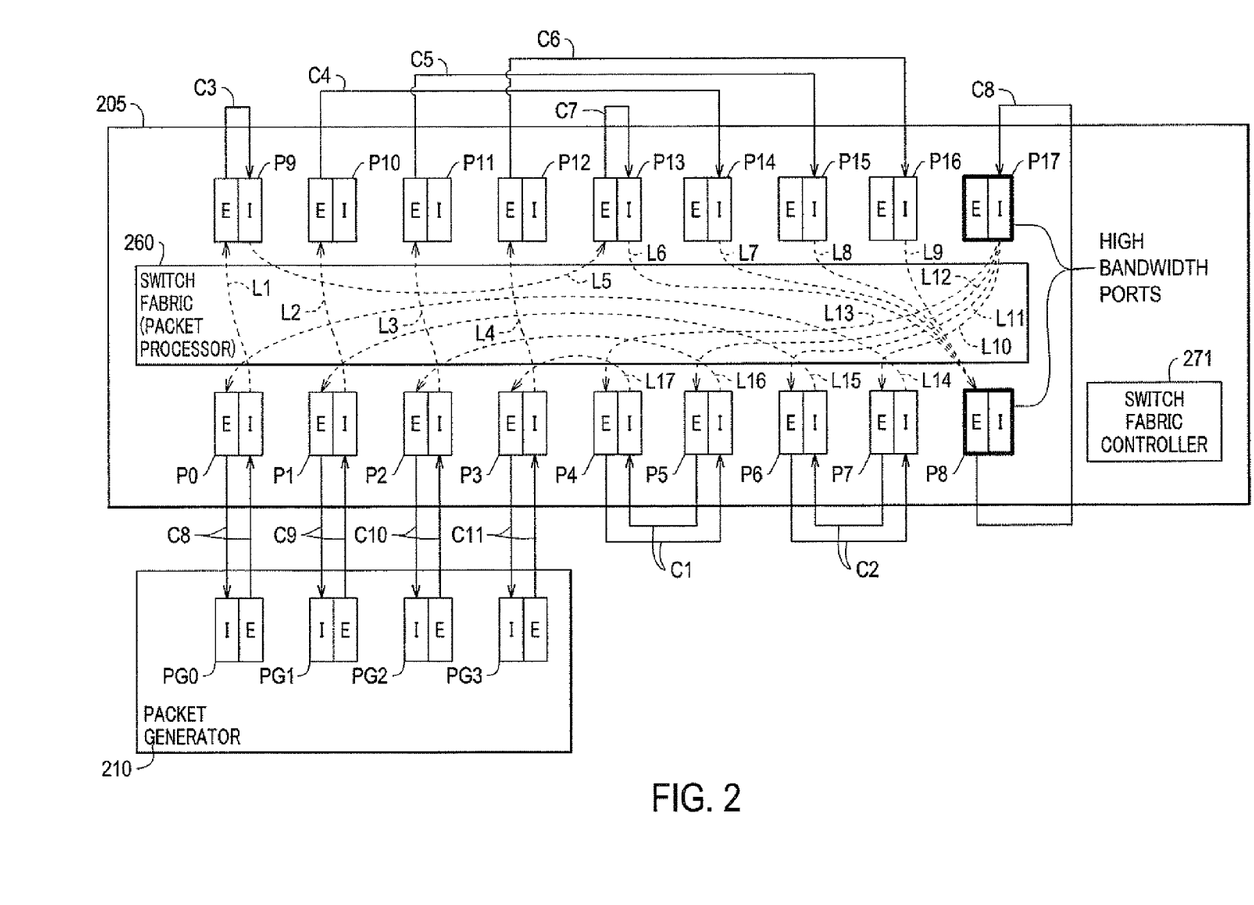
FIG. 2 shows a block diagram of a network switching apparatus example 205 under test according to an embodiment of the disclosure.

FIG. 2 shows a block diagram of a network switching apparatus example 205 under test according to an embodiment of the disclosure. The network switching apparatus 205 is coupled to a packet generator 210. The network switching apparatus 205 includes network ports P0-P17, a switch fabric 260 and a switch fabric controller 271. In an example, the network ports P0-P17 are bidirectional ports. The packet generator 210 includes packet generation ports PG0-PG3 that can be bidirectional ports. The network ports P0-P17 are coupled to the packet generation ports PG0-PG3 or are coupled to each other by external cables or jumpers, such as external cables C1-C11.

Specifically, each of the network ports P0-P17 and the packet generation ports PG0-PG3 includes an ingress (I) portion and an egress (E) portion. The I portion includes electronic components that are configured to receive packets from an external communication medium, such as cables C1-C11, in the desired network format, such as a format conforming to Ethernet standard. The E portion includes electronic components that are configured to transmit packets on an external communication medium, such as cables C1-C11, in the desired network format, such as a format conforming to Ethernet standard.

The switch fabric 260 is configured to interconnect the I portions and the E portions of the network ports P0-P17 within the network switching apparatus 205. Further, the switch fabric controller 271 controls the switch fabric 260 according to control parameters to establish packet forwarding associations. A packet forwarding association is established between an I portion of a first network port and an E portion of a second network port, so that packets may be routed from the I portion of the first network portion to the E portion of the second network port.

According to an embodiment of the disclosure, the network switching apparatus 205 is configured as a single integrated circuit (IC) chip. The switch fabric 260 is configured as a packet processor 260 within the IC chip. In an example, the packet processor 260 is configured to perform Layer 2 switching, and support various Layer 2 switching standards and protocols. For example, the packet processor 260 supports virtual local area network (VLAN) based on port, subnet and protocol. Further, the packet processor 260 supports single and multiple spanning tree, rapid spanning tree, link aggregation, link trunking, and the like. In addition, the packet processor 260 can be configured to perform Layer 3 routing. For example, the packet processor 260 supports IPv4 forwarding in hardware, IP multi-cast routing, and the like.

In another embodiment, the network switching apparatus 205 is configured as a chassis device having line cards and fabric cards. In an example, each of the line cards and the fabric cards is implemented as an IC chip. Each of the line cards includes first input/output (I/O) ports that are suitably coupled with various servers, and second I/O ports that are suitably coupled to I/O ports of the fabric cards. The fabric cards form the switch fabric 260 to switch packets among the line cards.

The types of control parameters used by the switch fabric controller 271 to establish packet forwarding associations using the switch fabric 260 depend on the standards for which the network switching apparatus 205 is designed. In an embodiment, the switch fabric controller 271 includes a forward data base to define the forwarding associations. The forward data base is set up based on the control parameters.

In the FIG. 2 example, the network ports P0-P3 are designated as termination ports and are connected to the packet generation ports PG0-PG3 of the packet generator 210 using bidirectional cables C8-C11, respectively. Further, a bidirectional cable C1 couples the network ports P4 and P5 externally, and a bidirectional cable C2 couples the network ports P6 and P7 externally. A single directional cable C4 couples the E portion of the network port P10 with the I portion of the network port P14, a single directional cable C5 couples the E portion of the network port P11 with the I portion of the network port P15, a single directional cable C6 couples the E portion of the network port P12 with the I portion of the network port P16, and a single directional cable C8 couples the E portion of the network port P8 with the I portion of the network port P17. A single jack cable C3 couples the E portion of the network port P9 to the I portion of the network port P9, and a single jack cable C7 couples the E portion of the network port P13 to the I portion of the network port P13.

Further, according to an aspect of the disclosure, the network ports P0-P17 may have different bandwidth. In the FIG. 2 example, the bandwidth of the network ports P8 and P17 is four times of the bandwidth of the other network ports in the network switching apparatus 205.

According to an embodiment of the disclosure, based on a selected external connection configuration, and bandwidths of the network ports P0-P17, four packet paths are determined as a combination of the external connections and internal packet forwarding associations. Control parameters to enable the internal packet forwarding associations are determined and transmitted to the switch fabric controller 271. The switch fabric controller 271 controls the switch fabric 260 according to the control parameters to establish the packet forwarding associations, such as the packet forwarding associations L1-L17. The established packet forwarding associations and the external connections are combined to form the four packet paths.

In the FIG. 2 example, a first packet path follows PG0→C8→P04→L1→P9-E→C3→P9-I→L5 P13-E→C7→P13-I→L6→P8-E→C8→P17-I→L10→P7-E→P6-I→L15→P1-E→C9→PG1; a second packet path follows PG1→C9→P1-I→L2→P10-E→C4→P14-I→L7→P8-E→C8→P17-I→L11→P6-E→C2→P7-I→L14→P0-E→C8→PG0; a third packet path follows PG2→C10→P2-I→L3→P11-E→C5→P15-I→L8→P8-E→C8→P17-I→L12→P5-E→C1→P4-I→L17→P3-E→C11→PG3; and a fourth packet path follows PG3→C11→P34→L4→P12-E→C6→P16-I→L9→P8-E→C8→P17-I→L13→P4-E→C1→P5-I→L16→P2-E→C10→PG2.

During a test run (a test scenario), in an example, the packet generator 210 generates four packet streams. The packet generation ports PG0-PG3 respectively provide the four packet streams to the network switching apparatus 205 at the same time. The four packet streams are respectively routed following the four packet paths. Further, the performance of the network switching apparatus 205 is monitored, and may be logged.

Figure 3:
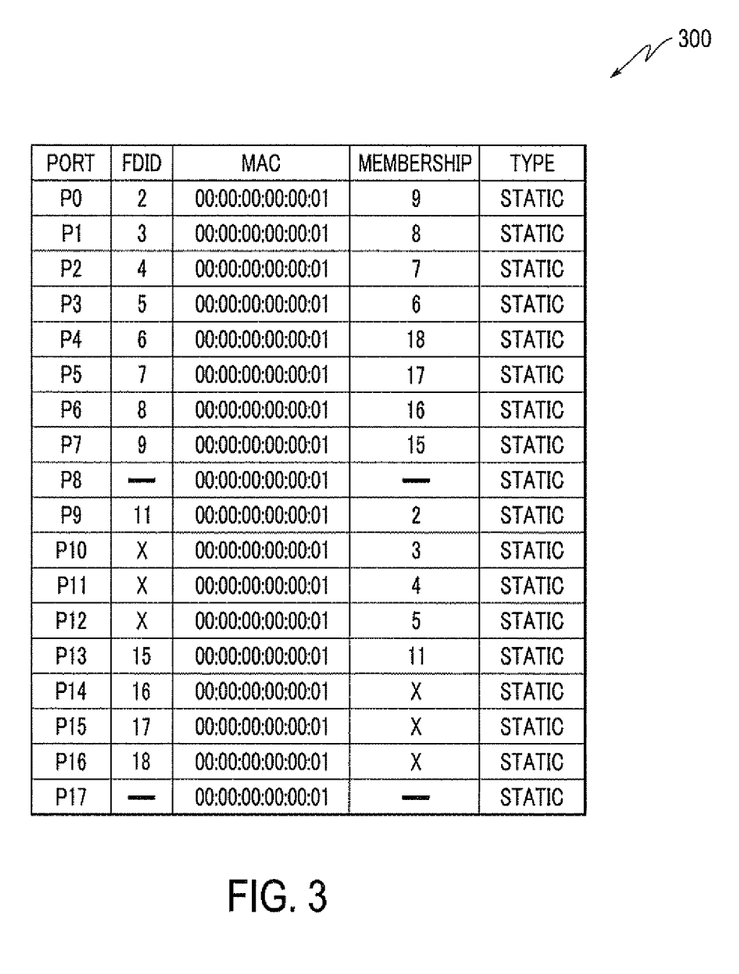
FIG. 3 shows a table 300 of control parameters according to an embodiment of the disclosure.

FIG. 3 is a table 300 of control parameters according to an embodiment of the disclosure. In an example, the switch fabric controller 271 uses the control parameters in the table 300 to set up a forward data base to define the packet forwarding associations L1-L17.

According to an embodiment of the disclosure, in the FIG. 3 configuration, the network ports P0-P7 and P8-P16 are configured to be tagged ports and have a static MAC address (00:00:00:00:00:01). Each tagged port includes a port forward identifier (FDID). The FDID is tagged to each packet received from the ingress portion of the tagged port. Each tagged port is also in a membership with another FDID. It is noted that some network ports, such as P8 and P17, can be non-tagged ports.

In an embodiment, a packet includes a field storing FDID. The switch fabric 260 sends the packet to a network port according to the FDID. For example, the switch fabric 260 sends the packet to a network port that is in the membership with the FDID. Specifically, an incoming packet is assigned a FDID according to the FDID of the incoming network port from which it is received. The FDID overrides any previous FDID assignment. The switch fabric 260 then switches the packet to a network port with the same FDID in the membership field in table 300. It is noted that the FDID changes on every entry of the packet to another incoming network port that is a tagged port. The outgoing network port is in the membership with FDID.

With reference to the FIG. 2 example, PG0-E of the packet generator 210 provides packets to P0-I of the network switching apparatus 205. Because the FDID of P0 is 2, P0-I overrides the FDIDs of the packets and assigns a new FDID of 2 to each packet. Further, since the network port P9 is in the membership with FDID of 2, the switch fabric 260 switches the packets according to the packet forwarding association L1 to P9-E. Then, P9-E transmits the packets along the cable C3 to P9-I. Because the FDID of P9 is 11, P94 overrides the FDIDs of the packets and assigns a new FDID of 11. Further, since the network port P13 is in the memebership with FDID of 11, the switch fabric 260 switches the packets according to the packet forwarding association L5 to P13-E. Then, P13-E transmits the packets along the cable C7 to P134. Because the FDID of P13 is 15, P134 overrides the FDIDs of the packets and assigns a new FDID of 15. Then, since the network port P8 is in the membership with FDID of 15, the switch fabric 260 switches the packets according to packet forwarding association L6 to P8-E. P8-E transmits the packets along cable C8 to P17-I. Because P17 is a non-tagged port, P17-I does not override the FDID. Thus, the packets still have the FDID of 15. Then, since the network port P7 is in the membership with FDID of 15, the switch fabric 260 switches the packets according to the packet forwarding association L10 to P7-E. P7-E transmits the packets along cable C2 to P6-I. Because the FDID of P6 is 8, P64 overrides the FDIDs of the packets and assigns a new FDID of 8. Then, since P1 is in the membership with FDID of 8, the switch fabric 260 switches the packets according to the packet forwarding association L15 to P1-E. N-E transmits the packets to PG1 of packet generator 210.

It is noted that some FDID and membership in table 300 are "X", which means do not care; and some FDID and membership in table 300 are "-", which means non-tagged port.

Figure 4:
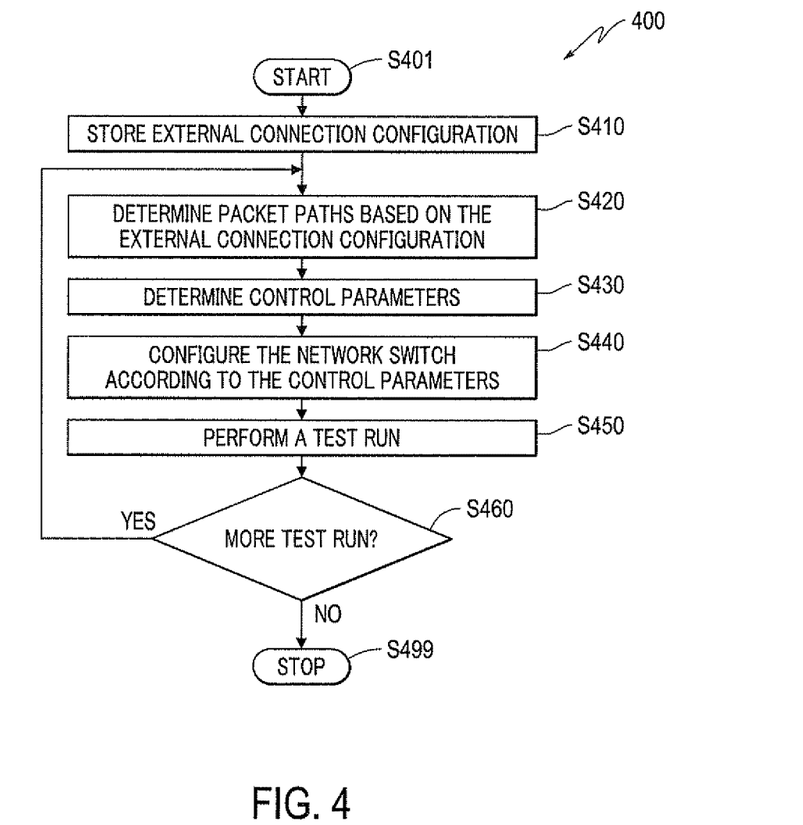
FIG. 4 shows a block diagram of a process 400 for the test system 100 to test the network switching apparatus 105 according to an embodiment of the disclosure.

FIG. 4 shows a flow chart outlining a process example 400 for a test system, such as the test system 100, to test a network switching apparatus, such as the network switching apparatus 105 according to an embodiment of the disclosure. The process starts at S401 and proceeds to S410.

At S410, the test manager 120 stores an external connection configuration of the external connection module 150 in the storage unit 121. The external connection module 150 includes external connections, such as the cables C1-C43 and CT1-CT2. The cables C1-C43 are configured to externally interconnect the network ports of the network switching apparatus 105, and the cables CT1-CT2 connect the network switching apparatus 105 to the packet generator 110. It is noted that the test manager 120 may also store other information of the network switching apparatus 105, such as bandwidths of the network ports, and the like.

At S420, the path generator 122 determines one or more packet paths based on the external connection configuration. Specifically, in an example, a packet path is a combination of the internal forwarding associations within the network switching apparatus 105 and external connections. According to an aspect of the disclosure, the path generator 122 sequentially determines the internal forwarding associations. In an example, each internal forwarding association includes a first port as a source port and a second port as a destination port. The internal forwarding association forwards packets from the source port to the destination port. The path generator 122 determines the source port of a present internal forwarding association in the sequence based on a previous internal forwarding association in the sequence and the external connection configuration. For example, when the external connection configuration includes an external connection that connects the destination port of the previous internal forwarding association with a port, which can be a different port or the same port as the destination port, of the network switching apparatus 105. The port is determined to be the source port of the present internal forwarding association.

Further, the path generator 122 determines the destination port of the present internal forwarding association. The path generator 122 can select the destination port in a deterministic manner or in a random manner. In an embodiment, the path generator 122 includes a random number generator. The path generator 122 determines the destination port of the present internal forwarding association based on a random number generated by the random number generator. In another example, the path generator 122 includes a pseudo random number generator to generate random numbers based on a seed, such as a seed selected based on a time stamp. Then, the path generator 122 determines the destination port of the present packet forwarding association based on the random numbers. It is noted that, in an example, the path generator 122 includes a validator configured to validate the forwarding association determined based on the random numbers. It is also noted that, in an example, the test manager 120 logs the seed. When a retest is needed, the path generator 122 retrieves the previously logged seed, and re-determines the packet path based on the same seed, in an embodiment.

It is also noted that the path generator 122 may consider other suitable factors or characteristics in order to generate the packet paths. In an example, the path generator 122 takes bandwidths of the network ports into consideration. The other factors or characteristics may affect a cost for transmitting a packet from an ingress port to an egress port.

At S430, the test manager 120 determines control parameters for the network switching apparatus 105 to establish the determined internal forwarding associations. In an example, the network switching apparatus 105 includes a forwarding data base. The test manager 120 determines control parameters for the network switching apparatus 105 to set up the forwarding data based. Based on the forwarding data base, the network switching apparatus 105 establishes the internal forwarding associations in the packet paths.

At S440, the test manager 120 provides the control parameters to the network switching apparatus 105 to establish the internal forwarding associations.

At S450, the test system 100 performs a test run. For example, the controller 125 informs the packet generator 110 to generate packets, and to provide the packets to the network switching apparatus 105. Further, the controller 125 informs the performance monitor 123 to monitor the performance of the network switching apparatus 105. In an example, the performance monitor 123 monitors a temperature of the network switching apparatus 105. In another example, the performance monitor monitors a number of packets being successfully transmitted along the packet paths. The test system 100 can record the monitored performance in the storage unit 121, or provide the monitored performance to the user interface 135.

At S460, the test manager 120 determines whether an additional test run is needed. When an additional test run is needed, the process returns to S420, otherwise the process proceeds to S499 and terminates.

Figure 5:
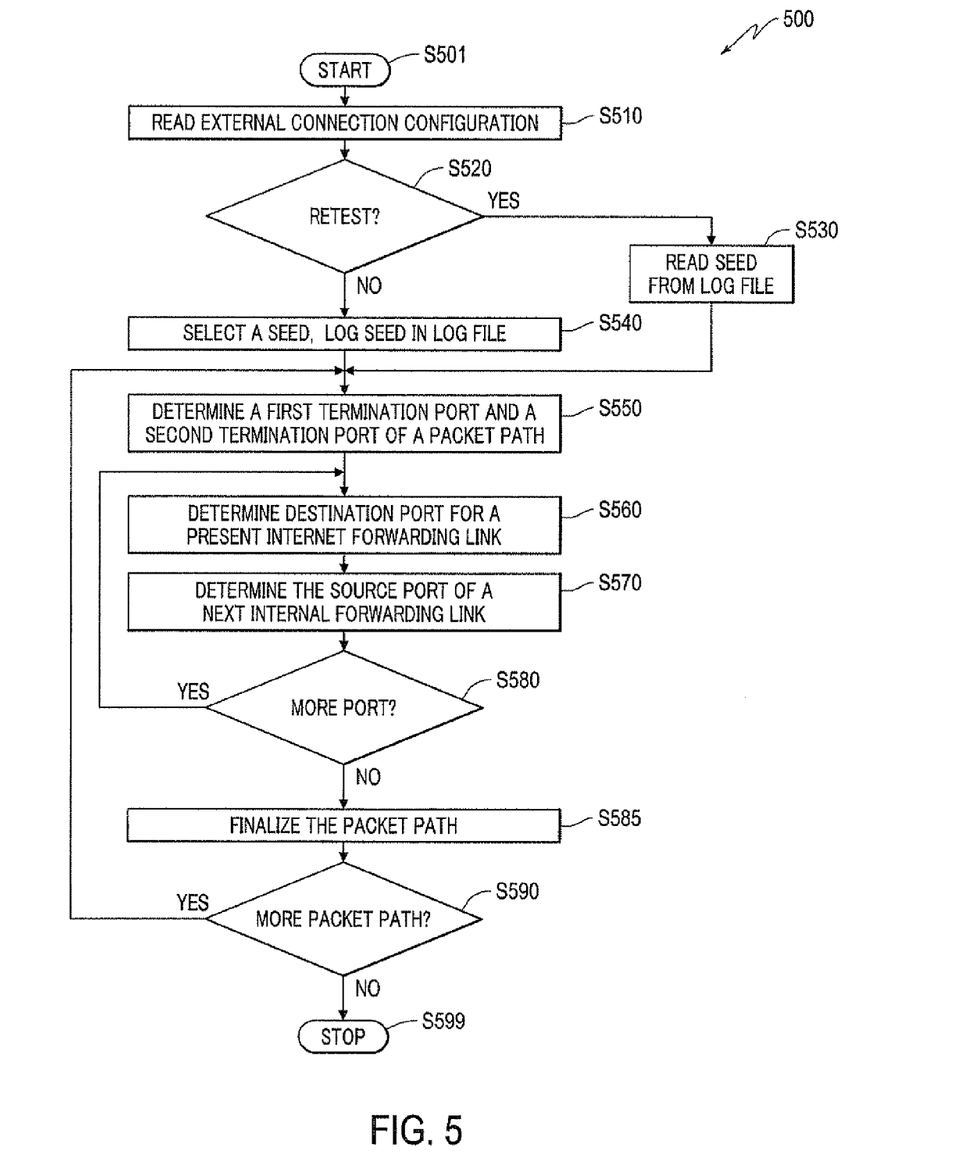
FIG. 5 shows a flow chart outlining a process example 500 for the path generator 122 to generate packet paths according to an embodiment of the disclosure.

FIG. 5 shows a flow chart outlining a process example 500 for the path generator 122 to generate packet paths according to an embodiment of the disclosure. The process starts at S501, and proceeds to S510.

At S510, the path generator 122 reads the external connection configuration stored in the storage unit 121. The external connection configuration includes external connections, such as C1-C43 and CT1-CT2, and the like.

At S520, the path generator 122 determines whether the packet path to generate is for a retest. When the packet path to generate is for a retest, the process proceeds to S530; otherwise, the process proceeds to S540.

At S530, the path generator 122 reads a seed from a log file that logs seeds of previous test runs. In an example, the path generator 122 retrieves a seed according to the time stamp.

At S540, the path generator 122 selects a seed and logs the seed. In an example, the path generator 122 determines a seed based on a time stamp.

At S550, the path generator 122 determines a first termination port and a second termination port of a packet path. In an example, the path generator 122 determines ports that are connected to the packet generator 110 by the external connections. Then, the path generator 122 selects the first termination port and the second termination port from the ports that are connected to the packet generator 110. In an example, the path generator 122 selects the first termination port as the source port of a present internal forwarding association.

At S560, the path generator 122 determines the destination port of the present internal forwarding association. In an embodiment, the path generator 122 determines the destination port in a random manner. In an example, the path generator 122 includes a pseudo random number generator that generates random numbers based on the selected seed. The path generator 122 determines the destination port of the present internal forwarding association based on the random numbers. In addition, the path generator 122 can determine the destination port based on other parameters, such as bandwidth of the ports and the like. In an embodiment, the path generator 122 includes a validator configured to validate the destination port. When the destination port is invalid, the path generator 122 re-determines another destination port. When the destination port is determined and validated, the present internal forwarding association is determined and added into the packet path.

At S570, the path generator 122 determines the source port of a next internal forwarding association based on the external connection configuration. For example, when the external connection configuration includes an external connection that connect the destination of the present internal forwarding association with a port of the network switching apparatus 105. The path generator 122 determines the port is the source port for the next internal forwarding association.

At S580, the path generator 122 determines whether there is an additional port on the packet path. When more port is needed, the process returns to S560; otherwise, the process proceeds to S585.

At S585, the path generator 122 finalizes the packet path. Specifically, the path generator 122 determines that the last internal forwarding association is from the determined source port to the second termination port. Thus, a packet path is completely determined.

At S590, the path generator 122 determines whether additional packet paths need to be generated to suitably test the device 105, 205. When more packet paths need to be generated, the process returns to S550; otherwise, the process proceeds to S599 and terminates.

While the subject matter of the present disclosure has been described in conjunction with the specific embodiments thereof that are proposed as examples, it is evident that many alternatives, modifications, and variations will be apparent to those skilled in the art. Accordingly, embodiments of the present disclosure as set forth herein are intended to be illustrative, not limiting. There are changes that may be made without departing from the scope of the present disclosure.

What is claimed is:

1. A system for testing a network switching apparatus, comprising:
    one or more port connections external to the network switching apparatus, the one or more port connections being configured to interconnect selected ports of the network switching apparatus to transfer packets between the selected ports;
    a test manager configured to automatically generate a plurality of test scenarios for testing a processing operation to be performed by the network switching apparatus on packets, the test scenarios defining paths for forwarding packets multiple times among the ports of the network switching apparatus; and
    a packet generator configured to transmit packets to at least a first port of the network switching apparatus to test a processing operation performed by the network switching apparatus, wherein
    the test manager is configured to sequentially determine internal forwarding associations along the paths,
    the test manager is configured to determine a source port of an internal forwarding association that is in connection with a previously determined internal forwarding association via a port connection, and determine a destination port of the internal forwarding association based on a random number generator, and
    the test manager is configured to determine the destination port of the internal forwarding association based on a pseudo random number generator with a selected seed.

2. The system of claim 1, wherein
    the test manager is configured to generate the test scenarios without knowledge of the one or more port connections, and invalidate the generated test scenarios that are inconsistent with actual port connections.

3. The system of claim 2, wherein the plurality of test scenarios is different from each other.

4. The system of claim 1, wherein the test manager is configured to log the selected seed.

5. The system of claim 1, wherein the test manager is configured to determine the destination port of the internal forwarding association based on the ports bandwidths.

6. The system of claim 1, wherein the test manager is configured to determine and provide control parameters to the network switch apparatus to set up the test scenario.

7. The system of claim 1, wherein the test manager further comprises:
    a performance monitor configured to monitor a performance of the network switching apparatus.

8. A method for testing a network switching apparatus, comprising:
    determining a plurality of test scenarios for testing a network switching apparatus with one or more port connections external to the network switching apparatus, the one or more port connections being configured to interconnect selected ports of the network switching apparatus to transfer packets between the selected ports, the test scenarios defining paths for forwarding packets multiple times among the ports of the network switching apparatus;
    providing control parameters to the network switching apparatus to respectively establish the plurality of test scenarios; and providing packets to the network switching apparatus for testing a processing operation of the network switching apparatus on the packets
    determining internal forwarding associations within the network switching apparatus;
    determining a source port of an internal forwarding association that is in connection with a previously determined internal forwarding association via an external connection; and determining a destination port of the internal forwarding association based on at least a random number generator, wherein determining the internal forwarding associations within the network switching apparatus further comprises sequentially determining the internal forwarding associations along a path, and determining the destination port of the internal forwarding association based on at least the random number generator further comprises determining the destination port of the internal forwarding association based on a pseudo random number generator and a seed.

9. The method of claim 8, further comprising:

determining the plurality of test scenario without knowledge of the one or more port connections; and invalidating the generated test scenarios that are inconsistent with actual port connections.

10. The method of claim 8, further comprising:

determining the control parameters to enable the determined internal forwarding associations.

11. The method of claim 8, further comprising: logging the seed for a future retest.

12. The method of claim 8, wherein determining the destination port of the internal forwarding association based on at least the random number generator further comprises:

determining the destination port of the internal forwarding association based on the random number generator and the ports bandwidths of the network switching apparatus.

13. The method of claim 8, further comprising:

monitoring a performance of the network switching apparatus during the processing operation of the network switching apparatus.

* * * * *